Nov. 21, 1967    J. A. SEYMOUR ET AL    3,353,306
HUB MOUNTING FOR GRINDING WHEELS
Filed Jan. 31, 1964
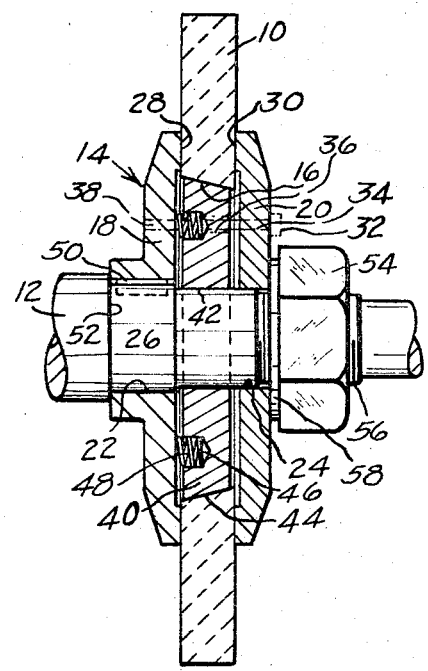
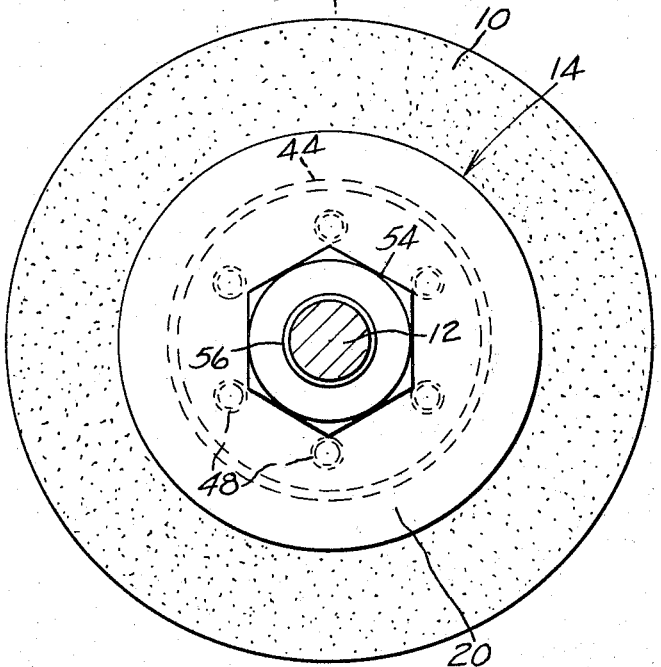
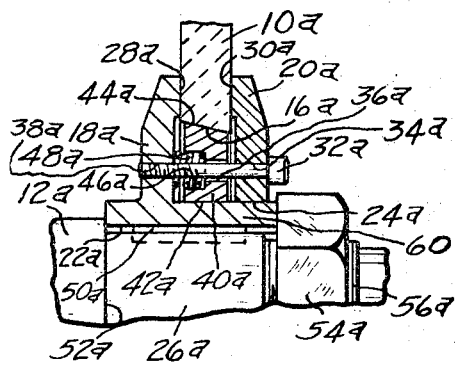
INVENTORS.
JAMES A. SEYMOUR
WALTER F. BETH
BY
ATTORNEY

United States Patent Office 3,353,306
Patented Nov. 21, 1967

3,353,306
HUB MOUNTING FOR GRINDING WHEELS
James A. Seymour, Warren, and Walter F. Beth, Holden, Mass., assignors to Norton Company, Worcester, Mass., a corporation of Massachusetts
Filed Jan. 31, 1964, Ser. No. 341,573
6 Claims. (Cl. 51—168)

ABSTRACT OF THE DISCLOSURE

The mounting fundamentally makes use of a conically shaped solid hub for receiving a grinding wheel with a conically shaped hole that is fitted onto the hub, and includes wheel driving flange means keyed to the drive shaft whereby to support the wheel on the shaft in such a manner that the hub serves to absorb shocks in a manner to prevent fatigue cracks from beginning to form due to the otherwise constant flexing of the wheel which would take place if the conical hub did not completely fill the center hole in the wheel.

---

This invention relates to wheel supports and, in particular, to wheel mounting for grinding wheels employed for snagging operations.

Conventionally, the wheel has a center opening for receiving an arbor or drive shaft and is supported on the arbor or shaft between the opposed flanges of driving elements fixed to the shaft at opposite sides of the wheel. For the sake of expediency in manufacture and assembly and to effect economy in the use of material, it is desirable to make the center hole of the wheel as large as possible however this, in turn, necessitates a larger clearance space to enable assembly, greater precision in grinding, lapping and honing operations, and a material lessening in the strength and stiffness of the wheel. As a consequence of the larger center hole and larger clearance required, the pressure and impact applied to the peripheral face of the wheel during operation produces excessive flexing (bending out-of-round), thereby subjecting the center portion of the wheel to repeated shock so that, through fatigue and stress beyond the elastic limit, radial cracks develop which ultimately result in wheel failure.

This invention has for its objects to provide a wheel mounting which will lessen the destructive effect of flexing due to the large center hole and the large clearance required thereby eliminating the necessity for such large clearance without adversely affecting the assembly; to provide a mounting in which substantially no clearance is required so that impact shock is lessened thereby compensating for the loss of strength due to the use of a large hole at the center; and to provide a mounting which eliminates the necessity for precision grinding, lapping and honing operations in its manufacture.

As herein illustrated, the mount comprises opposed clamping elements containing concentric openings for receiving the shaft to which the wheel is to be applied, means operative to fix one of the clamping elements to the shaft for rotation therewith, annular lands on the opposed surfaces of the clamping elements adapted to have contact with the side faces of the wheel, marginally of the center opening therein, means operative to draw the clamping elements together to engage the annular lands with the side faces of the wheel, and a rigid hub containing an opening for receiving the shaft, mounted within the center opening of the wheel between the clamping elements, which has an axial thickness which is less than the distance between the clamping elements and a peripheral edge of right-conical section intimately engaged with the opening at the center of the wheel which is correspondingly of right-conical section. The hub has a smooth center bore for slidably receiving the shaft and is movable axially between the clamping elements and there is yieldable means in the form of a plurality of coiled springs disposed under compression concentrically with the center of the hub, between the side face of the hub of larger diameter and the clamping element at that side, yieldably holding the hub engaged within the center opening of the wheel. The clamping elements are held engaged with the opposite side faces of the wheel by bolts extending through openings in one of the clamping elements, the hub, and threaded into the other or alternatively by a nut threaded on to the shaft which engages one of the clamping elements forcing it, and the wheel, and the other clamping element against an opposing shoulder on the shaft. Recesses are provided in the face of the hub for receiving the coiled springs.

Optionally, one of the clamping elements has a centrally located sleeve adapted to be fixed to the shaft, the other clamping element has a central opening for receiving the sleeve, and the rigid hub is mounted on the sleeve between the elements.

The invention will now be described in greater detail with reference to the accompanying drawings wherein:
FIG. 1 is a side elevation of a grinding wheel and the mounting which forms the subject matter of the present invention;
FIG. 2 is a section on the line 2—2 of FIG. 1, showing the shaft in elevation; and
FIG. 3 is a fragmentary section showing a modification of the mounting.

Referring to the drawings, a wheel 10 of abrasive material is shown supported on a drive shaft 12 by a mounting 14.

The abrasive wheel 10 contains a relatively large center opening 16 of right-conical section, the taper of the opening being in the order of 15° and, in any event, sufficiently large to prevent self-locking with a mating surface of corresponding right-circular section.

The mounting 14 comprises a pair of clamping elements 18 and 20 in the form of circular discs having center openings 22 and 24 adapted to receive the reduced portion 26 of the shaft 12. The driving elements 18 and 20 have at their marginal edges annular lands 28 and 30 which are adapted to have contact with the side surfaces of the wheel 10, marginally of the center opening 16, and to this end the inner radius of each of the lands is slightly greater than the larger radius of the right-conical opening in the wheel. Bolts 32, one of which is drawn in phantom line (FIG. 2), may be provided for drawing the driving elements together frictionally to engage the lands 28 and 30 with the side surfaces of the wheel. The bolts are distributed uniformly and concentrically with respect to the axis of the shaft in openings 34 in one of the driving elements and threaded into openings 38 in the other of the driving elements more clearly shown in FIG. 3 with the suffix "a" added to the identical character.

A rigid hub 40 is mounted on the reduced portion 26 of the shaft within the center opening 16 in the wheel 10, between the clamping elements 18 and 20. The hub has a smooth center bore 42 so that it is free to slide axially on the shaft 12, an axial thickness which is less than the distance between the opposed surfaces of the clamping elements 18 and 20, and a right-conical, peripheral surface 44 having a taper corresponding to the taper of the center opening 16 in the wheel, intimately engaged with the latter.

The rigid hub 40 contains a plurality of recesses 46 in the side surface of larger diameter within which are disposed, under compression, a corresponding number of coiled springs 48, with their ends, respectively, engaged within the recesses and with the clamping element 18 at that side. The springs yieldingly press and hold the hub engaged with the center opening 16 of the wheel while permitting axial yield of the hub, since the peripheral surface of the latter is smooth and not drivably engaged with the wheel, thereby operating as a shock-absorbed or dissipater. When bolts 32 are utilized the hub is provided with enlarged openings 36 (shown in phantom lines in FIG. 2) coaxial with the recesses and with the openings 34 and 38 in the clamping elements 18 and 20 to permit passage of the clamping bolt 32 through it internally of the springs without interfering with limited rotational movement thereof.

The clamping element 18 is fixed to the shaft 12 for rotation therewith by a key 50 and the mounting is held axially against a shoulder 52 at the junction of the shaft 12 and the reduced portion 26 thereof by a nut 54 screwed onto a threaded portion 56 of the shaft at the opposite side against a washer 58 engaged with the clamping element 20.

It can be seen in FIG. 2 that the mounting 14 can be used with or without the bolts 32. When the nut itself is screwed onto the shaft 12 it moves the clamping element 20, washer 58, and wheel 10 against the clamping element 18 opposed by the shoulder 52; clamping the mounting between the shoulder 52 and the nut 54 and consequently the wheel between the clamping elements 18 and 20.

In a modified form, the mounting, as shown in FIG. 3, comprises a clamping element 18a and a clamping element 20a. The clamping element 18a has a centrally disposed sleeve 60 containing an opening 22a adapted to receive the reduced portion 26a of the shaft 12a and to be secured thereto by a key 50a against a shoulder 52a by a nut 54a. The clamping element 20a contains a central opening 24a adapted to receive the sleeve 60. The clamping elements 18a and 20a are provided with lands 28a and 30a and are drawn together to clamp the wheel 10a between them by means of bolts 32a as previously described. The wheel is provided with a center opening 16a of right-conical section and a hub 40a, provided with a smooth center opening 42a, is mounted on the sleeve 60 within the center opening 16a between the clamping members 18a and 20a. The hub is of lesser thickness than the distance between the clamping elements, is free to move axially on the sleeve 60 a limited amount and has a right-conical section 44a peripherally thereof which is intimately engaged with the right-conical opening 16a of the wheel. The hub is held engaged with the center opening by compression springs 48a disposed in recesses 46a in the larger face of the hub.

As herein illustrated, the drive for effecting rotation of the wheel is entirely through the driving elements since the hub is not fixed to the drive shaft. The hub serves solely as a support for the center of the wheel and, as explained, is yieldably held in intimate engagement with the center hole of the wheel so that it dissipates shock imparted to the peripheral surface of the wheel by eliminating the excessive clearance heretofore required in wheel mounting to enable assembly thereof. The self-compensating effect of the right-conical taper provided at the center opening of the wheel allows for greater tolerance in the wheel opening so that it may be molded or machined to size without requiring press-fitting and without precision grinding, lapping and honing operations; enables use of large holes and thereby the economic use of grinding material without requiring increased clearance; and lessens wheel distortion, cracks and failure.

The improvement in resistance to breakage by reducing the clearance between the center opening of the wheel and the support for the wheel with respect to both impact and static pressure was demonstrated by subjecting wheels to impact and static pressure with the center support and wheel intimately engaged, that is, with zero clearance and, again, at a clearance of .025 inch. The following table contains data of tests carried out on eight and twelve inch wheels.

| Size | Clearance (inch) | Impact to Break (ft. lbs.) | Pressure to Break (lbs.) | Percent Improved |
| --- | --- | --- | --- | --- |
| 12 x 1 x 6/5½ | 0 | 98 | | 20 |
| 12 x 1 x 6/5½ | .025 | 82 | | |
| 12 x 1 x 6/5½ | 0 | | 8,300 | 10 |
| 12 x 1 x 6/5½ | .025 | | 7,500 | |
| 8 x 1 x 6/5½ | 0 | 29 | | 50 |
| 8 x 1 x 6/5½ | .025 | 18 | | |
| 8 x 1 x 6/5½ | 0 | | 2,000+ | 25 |
| 8 x 1 x 6/5½ | .025 | | 1,600 | |

It should be understood that the present disclosure is for the purpose of illustration only and that this invention includes all modifications and equivalents which fall within the scope of the appended claims.

We claim:

1. A wheel mounting for a wheel of appreciable axial thickness having side faces and a center opening which opening has a tapered wall passing from one to the other of said side faces, comprising a rotatable shaft, opposed clamping devices containing openings for receiving the shaft, means operative to fix the clamping devices, to the shaft for rotation therewith, annular lands on the clamping devices adapted to have contact with the side faces of the wheel marginally of the center opening, means operative to draw the clamping devices into clamping engagement with the side faces of the wheel, and a rigid hub mounted on the shaft within the center opening of the wheel between the clamping devices, said hub corresponding substantially in axial thickness to the axial thickness of the wheel and the peripheral edge of the hub having a conical surface mating substantially with the tapered wall surface of the center opening of the wheel.

2. A wheel mounting according to claim 1, wherein the hub has a smooth bore adapted to have slidable engagement with the shaft.

3. A wheel mounting according to claim 1, wherein the hub has a smooth bore adapted to have sliding and rotational contact with the shaft.

4. A wheel mounting for a wheel having side faces and a center opening with a wall of right-conical section between the side faces, comprising a rotatable shaft, driving elements containing openings for receiving the shaft, said driving elements being mounted on said shaft in spaced apart relation, means operative to connect at least one of the driving elements to the shaft for rotation therewith, concentric annular lands on the opposed surfaces of the driving elements adapted to engaged the side faces of the wheel, means operative to draw the elements together and hence to clamp the wheel between the lands to provide for rotation of the wheel, a rigid shock-absorbing element on the shaft with substantially all of the shock-absorbing element disposed within the center opening in the wheel, said shock-absorbing element having a rotating contact with the shaft and a right-conical, peripheral surface having intimate engagement with the wall of the center opening of the wheel, said shock-absorbing element being of lesser thickness than the space between the driving elements, and means operative yieldingly to hold the shock-absorbing element engaged with the wall of the wheel opening.

5. A wheel mounting for a wheel having side faces and a center opening of right-conical wall section, comprising a rotatable shaft; driving elements, one of which has an integral sleeve drivably to receive the shaft and the other an opening for receiving the sleeve, said one element being drivingly engaged on said shaft and the other element being mounted on said sleeve; concentric annular lands on the opposed surfaces of the elements dimensioned to have contact with the side faces of the wheel marginally of the center opening; means operative to draw the elements together to clamp the annular lands against the side faces of the wheel; and a rigid hub having an opening therein said opening being of a size to fit and being disposed about the sleeve of the one element; said hub having a periphery of a size to fit within the center opening of the wheel between the elements with the peripheral face of the hub intimately engaged with the wall of the center opening of the wheel.

6. A wheel mounting according to claim 5, wherein the hub is axially movable on the sleeve within the center opening between the elements and there is yieldable means disposed between one of the elements and the hub operative to hold the hub within the center opening.

References Cited

UNITED STATES PATENTS

| | | | |
|---|---|---|---|
| 158,617 | 1/1875 | Bannister et al. | 51—168 |
| 1,459,683 | 6/1923 | Norris | 143—155 |
| 1,493,383 | 5/1924 | Quigley | 51—168 |
| 1,709,820 | 4/1929 | Gammeter | 51—168 |
| 2,291,386 | 7/1942 | Hager | 51—168 |
| 2,436,466 | 2/1948 | Wilson | 51—168 |
| 3,239,965 | 3/1966 | Roney | 51—168 |

FOREIGN PATENTS 85,455   2/1896   Germany.

ROBERT C. RIORDON, *Primary Examiner.*
LESTER M. SWINGLE, *Examiner.*
J. A. MATHEWS, *Assistant Examiner.*